United States Patent
Malone et al.

(10) Patent No.: US 7,330,119 B2
(45) Date of Patent: *Feb. 12, 2008

(54) REMOTE MEASUREMENT EMPLOYING RFID

(75) Inventors: Christopher G. Malone, Loomis, CA (US); Thane M. Larson, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 207 days.

This patent is subject to a terminal disclaimer.

(21) Appl. No.: 11/117,803

(22) Filed: Apr. 29, 2005

(65) Prior Publication Data

US 2006/0244594 A1 Nov. 2, 2006

(51) Int. Cl.
*G08B 1/08* (2006.01)
*G08B 13/14* (2006.01)
*G08B 26/00* (2006.01)
*H04Q 7/00* (2006.01)

(52) U.S. Cl. .............. 340/572.1; 340/539.15; 340/505

(58) Field of Classification Search ..... 340/571–573.1, 340/568.1–568.8, 539.1, 539.11–539.19, 340/505; 365/7, 9, 170
See application file for complete search history.

(56) References Cited

U.S. PATENT DOCUMENTS

| | | | |
|---|---|---|---|
| 5,486,812 A * | 1/1996 | Todd ...................... | 340/539.14 |
| 5,629,981 A | 5/1997 | Nerlikar | |
| 5,907,491 A | 5/1999 | Canada et al. | |
| 5,920,261 A * | 7/1999 | Hughes et al. ........... | 340/568.8 |
| 5,960,085 A | 9/1999 | de la Huerga | |
| 6,070,240 A | 5/2000 | Xydis | |
| 6,154,137 A | 11/2000 | Goff et al. | |
| 6,272,330 B1 * | 8/2001 | Speake ...................... | 455/341 |
| 6,401,209 B1 | 6/2002 | Klein | |
| 6,714,133 B2 * | 3/2004 | Hum et al. .............. | 340/573.4 |
| 6,747,560 B2 | 6/2004 | Stevens, III | |
| 6,813,209 B2 | 11/2004 | Crain et al. | |
| 6,825,754 B1 | 11/2004 | Rolin | |
| 6,832,251 B1 | 12/2004 | Gelvin et al. | |
| 6,838,989 B1 | 1/2005 | Mays et al. | |
| 6,842,121 B1 | 1/2005 | Tuttle | |
| 2003/0046339 A1 | 3/2003 | Ip | |
| 2004/0113790 A1 * | 6/2004 | Hamel et al. ............ | 340/572.1 |
| 2004/0212493 A1 * | 10/2004 | Stilp .......................... | 340/531 |

(Continued)

FOREIGN PATENT DOCUMENTS

GB     2 148 075 A   *   5/1985

(Continued)

OTHER PUBLICATIONS

Want, Roy, "Enabling Ubiquitous Sensing with RFID," Computer, Invisible Computing, pp. 84-86, (Apr. 2004).

(Continued)

*Primary Examiner*—Benjamin C. Lee
*Assistant Examiner*—Jennifer Mehmood

(57) ABSTRACT

A measurement system includes a transceiver and a transponder. The transceiver is configured to send and receive radio frequency signals. The transponder is configured to receive radio frequency signals from the transceiver and to send radio frequency signals to the transceiver. The transponder includes a sensor. The transceiver is configured to send an activation signal to the transponder thereby enabling the first transponder sensor to make a measurement and to hold the measurement.

18 Claims, 2 Drawing Sheets

U.S. PATENT DOCUMENTS

2005/0035862 A1* 2/2005 Wildman et al. ........ 340/573.1
2005/0248455 A1* 11/2005 Pope et al. ............ 340/539.27

FOREIGN PATENT DOCUMENTS

WO    WO 2004/006051    1/2004

OTHER PUBLICATIONS

National Semiconductor Corporation, "LM79 Microprocessor System Hardware Monitor," DS100036, pp. 1-30, (2001). <www.national.com>.

National Semiconductor Corporation, "Thermal Management Products," Selection Guide, pp. 5, (Fall 2004).

* cited by examiner

REMOTE MEASUREMENT EMPLOYING RFID

CROSS-REFERENCE TO RELATED APPLICATIONS

This Utility Patent Application is related to U.S. patent application Ser. No. 11/117,994, entitled "REMOTE MEASUREMENT OF MOTION EMPLOYING RFID," and U.S. patent application Ser. No. 11/118,021, entitled "REMOTE DETECTION EMPLOYING RFID," which are all filed on even date herewith, are all assigned to the same assignee as the present application, and are all herein incorporated by reference.

BACKGROUND

The present invention relates to radio frequency (RF) communications, and more particularly, to radio frequency identification (RFID) systems. Wireless communication systems that communicate signals over the RF spectrum are well known in the art. One such system is the RFID system. Typically, an RFID system includes a transceiver having a transceiver antenna, and a tag or transponder having a transponder antenna. Typically, the transponder is electronically programmed with unique information. The transceiver periodically transmits RF interrogation signals to the transponder. Upon receiving an interrogation signal, the transponder responds by transmitting a response signal containing data.

RFID systems have been used in a variety of circumstances, such as for tracking inventory, tracking movements of objects, various security applications, and a variety of other applications. RFID systems have not, however, typically been employed as measuring devices. Consequently, there is a need for the present invention.

SUMMARY

One aspect of the present invention provides a measurement system. The system includes a transceiver and a transponder. The transceiver is configured to send and receive radio frequency signals. The transponder is configured to receive radio frequency signals from the transceiver and to send radio frequency signals to the transceiver. The transponder includes a sensor. The transceiver is configured to send an activation signal to the transponder thereby enabling the first transponder sensor to make a measurement and to hold the measurement.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

Figure 1:
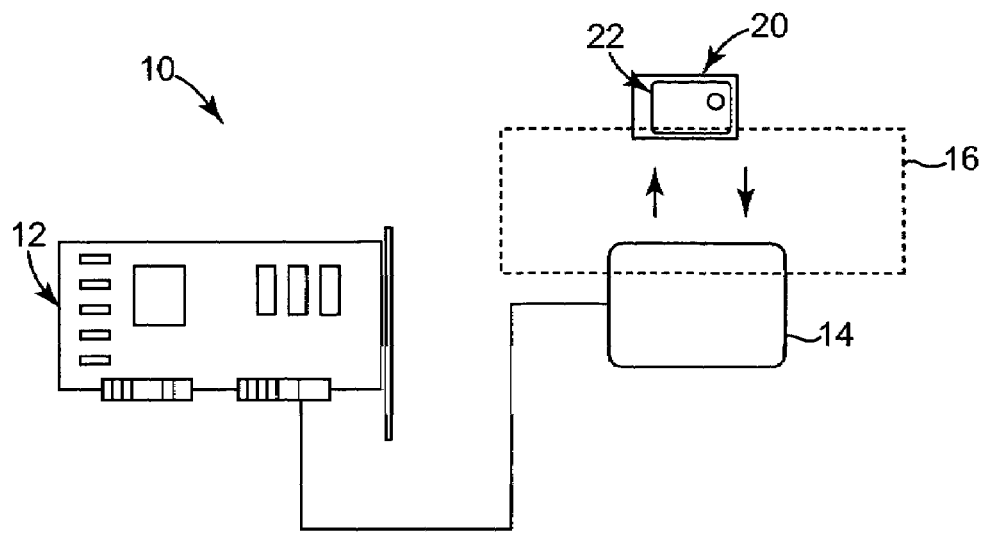
FIG. 1 is a block/schematic diagram illustrating an RFID system.

FIG. 1 illustrates radio frequency identification (RFD) system 10. RFID system 10 includes transceiver 12 and transponder 20. Transceiver 12 includes transceiver antenna 14. Transponder 20 includes transponder antenna 22. Signals generated by transceiver antenna 14 and by transponder antenna 22 are transferred through medium interface 16.

Transceiver 12 of RFID system 10 is configured to communicate with transponder 20. In one embodiment, transceiver 12 includes a microprocessor, and in another embodiment, transceiver 12 is coupled to a host system that includes a microprocessor. In one embodiment, transceiver antenna 14 is integrated within a single transceiver device. In one embodiment, transceiver 12 includes a separate transceiver circuit device and a separate transceiver antenna 14. Transceiver antenna 14 emits radio frequency signals that are transmitted through medium 16 to activate transponder 20. After activating transponder 20, transceiver 12 reads and writes data to and from transponder 20. Transceiver antenna 14 and transponder antenna 22 are the conduits between transceiver 12 and transponder 20, and communicate radio frequency signals through medium interface 16.

In some embodiments, medium interface 16 is air, and in other embodiments medium interface 16 includes air and other materials. Transceiver antenna 14 and transponder antenna 22 can be of a variety of shapes and sizes, dependent upon the anticipated distance separating them, the type of medium 16 that is between antennas 14 and 22, and on other factors.

Transceiver 12 typically performs a variety of functions in controlling communication with transponder 20. In one case, transceiver 12 emits output signals from transceiver antenna 14, thereby establishing an electromagnetic zone for some distance adjacent antenna 14. When transponder 20 passes through the electromagnetic zone established by transceiver antenna 14, transponder 20 detects an activation signal from transceiver 12. Transponder 20 typically has integrated circuits that include data that is encoded in memory. Once transponder 20 is activated with the activation signal, transceiver 12 decodes data that is encoded in transponder 20. For instance, in one embodiment transceiver 12 performs signal conditioning, parity error checking and correction.

Typically, transceiver 12 emits radio waves in ranges from a few millimeters up to hundreds of feet or more, depending on its output power and upon the radio frequency used. In one case, transceiver 12 is integrated in a circuit board card that is then coupled to a host computer, which processes the received data and controls some of the communication with transponder 20.

Figure 2:
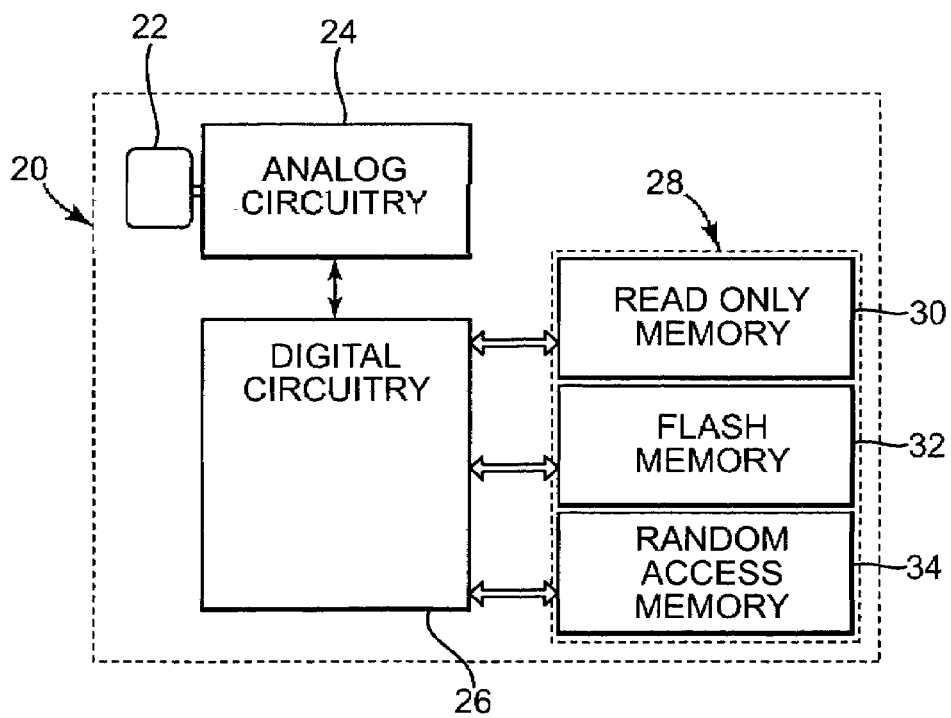
FIG. 2 is a block diagram illustrating a transponder.

FIG. 2 illustrates one embodiment of transponder 20. In one case, transponder 20 includes transponder antenna 22, analog circuitry 24, digital circuitry 26, and memory 28. In various embodiments, memory 28 can include read only memory (ROM) 30, flash memory 32, and/or random access memory (RAM) 34.

Transponder 20 comes in a variety of shapes and sizes for use in a variety of applications. For example, in one embodiment transponder 20 is configured as a small cylindrical-shaped tube having a diameter the size of a typical pencil lead. For example, such a transponder can be inserted beneath the skin of an animal to facilitate tracking the animal. In another embodiment, transponder 20 is screw-shaped such that it is screwed into trees or wooden items for identification or related purposes. In still other cases, transponder 20 is credit-card shaped for use in a multitude of access and/or security applications. In another embodiment, transponder 20 is embedded in hard plastic tags attached to merchandise in stores for security purposes, and in other embodiments it is in heavy-duty relatively large cases that are used to track inter-modal containers or heavy machinery, as well as a variety of other applications.

In some embodiments, transponder 20 includes one or more types of memory 28. For example, in some embodiments memory 28 includes ROM 30 to accommodate security data and operating system instructions that are employed in conjunction with analog circuitry 24 and digital circuitry 26 to control the flow of data within transponder 20. In other embodiments, memory 28 includes RAM 34 to facilitate temporary data storage during a time period when transceiver 12 is interrogating transponder 20 for a response. In other embodiments, memory 28 includes flash memory 32 to store data in transponder 20 that is non-volatile in order to ensure that the data is retained when transponder 20 is in a quiescent or power saving state. In some embodiments, memory 28 includes other types of non-volatile programmable memory, such as programmable read-only memory (PROM), erasable programmable read-only memory (EPROM), and electrically erasable programmable read-only memory (EEPROM). Any one of memory types ROM 30, flash memory 32 (or other non-volatile programmable memory), or RAM 34 can be used, or any combination thereof can be used.

In one embodiment, transponder 20 is an active transponder device. An active transponder is powered by an internal energy source, such as a battery configured within analog circuitry 24. Such active transponders are typically "read/write," which means data stored within memory 28 of transponder 20 can be rewritten and/or modified. An active transponder can also be powered from an existing source in another electronic device. For example, where transponder 20 is an active transponder coupled within a computer system, the power supply within the computer system supplies power to the transponder.

In one embodiment, transponder 20 is a passive transponder device. Passive transponders operate without a separate internal power source and obtain operating power from transceiver 12. Rather than having a battery within analog circuitry 24, for example, passive tags instead can use a strongly capacitive circuit and a charge pump within analog circuitry 24. The capacitive circuit and charge pump are configured to receive radio frequency energy from transceiver 12 and store it for use within transponder 20, for example, to control digital circuit 26 and memory 28.

Since active transponders accommodate an internal battery, they are typically larger in size than passive transponders. Memory size within an active transponder varies, but can be fairly significant with some systems operating, for example, with up to a megabyte or more of memory. Active transponders also typically have a longer ready range such that transceiver 12 and transponder 20 are typically placed apart at greater distances than in the case of passive transponders. In the same way, passive transponders typically have shorter read ranges, but are typically much smaller and lighter than active transponders and are typically less expensive.

In addition to including a battery for active transponders or capacitive circuit and charge pump for passive transponders, analog circuitry 24 typically include interface circuits for data transfer between transponder antenna 22 and digital circuitry 26. Digital circuitry 26 in turn typically includes control logic, security logic, and internal logic or microprocessor capabilities. This control logic controls the flow of data to and from memory 28.

Figure 3:
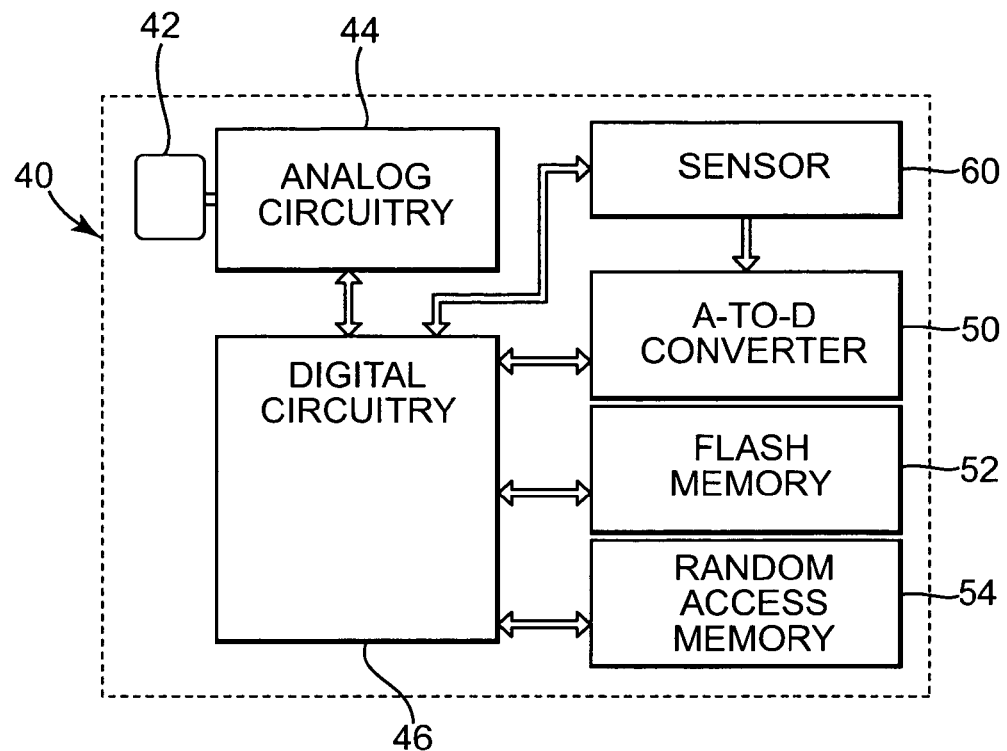
FIG. 3 is a block diagram illustrating a transponder in accordance with one embodiment of the present invention.

FIG. 3 illustrates transponder 40 in accordance with one embodiment of the present invention. Transponder 40 includes transponder antenna 42, analog circuitry 44, digital circuitry 46, analog-to-digital converter (ADC) 50, flash memory 52, random access memory (RAM) 54, and sensor 60.

Sensor 60 is configured to make measurements in a variety of applications. In one embodiment, sensor 60 is configured to measure temperature. In another embodiment, sensor 60 is configured to measure motion. In other embodiments, sensor 60 is configured to make various other measurements.

In one embodiment, sensor 60 is configured to measure magnetic fields. In one embodiment, sensor 60 is a Hall-effect sensor. In operation, transponder 40 is used in conjunction with a transceiver such that a transceiver first sends radio frequency signals to transponder 40. These radio frequency signals are received via transponder antenna 42 and sent to analog circuitry 44. In one embodiment, analog circuitry 44 includes a capacitive circuit and a charge pump. In this way, received radio frequency signals charge the capacitive circuit within analog circuitry 44. The storage energy is then used to energize digital circuitry 46.

In one embodiment, digital circuitry 46 includes control circuitry for activating flash memory 52 and RAM 54, as well as enabling ADC 50 and sensor 60. In this way, upon activation by digital circuitry 46, sensor 60 makes a measurement of a magnetic field and sends the measured signal to ADC 50. The measured signal, which is in analog form, is then converted to digital form by ADC 50. In one embodiment, the digitized measured signal is then stored in flash memory 52. In this way, the transceiver then subsequently interrogates transponder 40 in order to read the digitized measured signal stored in flash memory 52 of transponder 40. In another embodiment, the transceiver interrogates transponder 40 in order to read the digitized measured signal directly from ADC 50, such that there is no memory for storing the measured value.

Figure 4:
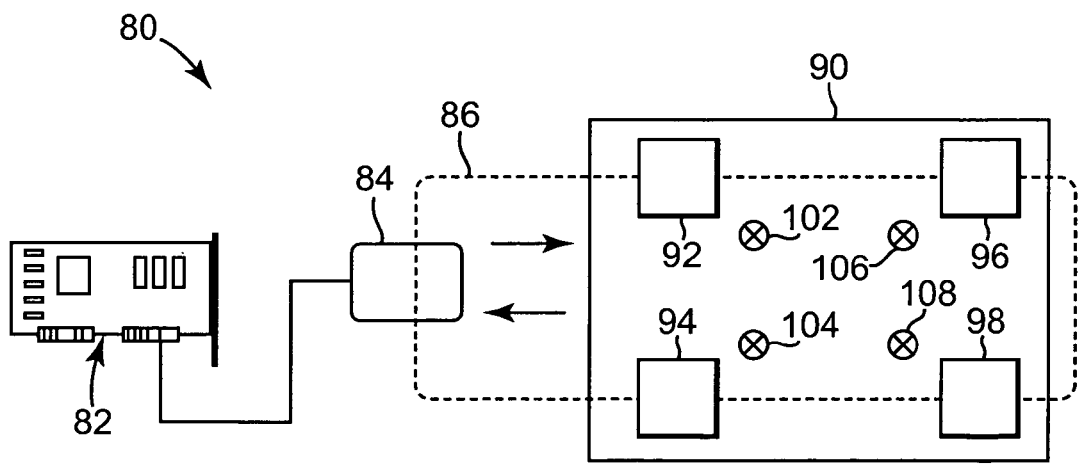
FIG. 4 is a block/schematic diagram illustrating an RFID system in accordance with one embodiment of the present invention.

FIG. 4 illustrates RFID system 80 in accordance with one embodiment of the present invention. RFID system 80 includes transceiver 82, transceiver antenna 84, limited-access area 90, first, second, third, and fourth transponders 92, 94, 96, and 98, and first, second, third, and fourth measurement locations 102, 104, 106, and 108. Medium interface 86 is between transceiver antenna 84 and first-fourth transponders 92-98.

In one embodiment of the present invention, RFID system 80 is used to remotely measure various locations in limited-access area 90 without requiring a wired access to limited-access area 90. RFID system 80 is quite useful in applications where access to measurement points is difficult with wires. With RFID system 80, multiple measurements from a plurality of transponders allow multiple measurements using the same simple RFID interface.

In operation of one embodiment, a plurality of transponders 92-98 are placed adjacent a plurality of measurement locations 102-108. In one embodiment, in each of these measurement locations 102-108 are in limited-access area 90. Consequently, using RFID system 80, measurements are made at each of locations 102-108 without a physical connection thereto. Instead, transceiver 82 sends radio frequency signals via transceiver antenna 84 through medium interface 86 to first-fourth transponders 92-98. In this way, measurements are made in locations where in is not convenient, or even where it is not possible, to route wires to the measurement location.

In one embodiment, each of transponders 92-98 are configured similarly to transponder 40 illustrated in FIG. 3. In this way, each of transponders 92-98 has a transponder antenna, analog and digital circuitry, a sensor, an analog-to-digital converter (ADC) and memory. In one case, measurement locations 102-108 each emit a magnetic field of varying levels over time. In one embodiment, the sensors within transponders 92-98 are Hall-effect sensors such that they sense the magnetic field emitted from measurement locations 102-108 upon their activation by digital control circuitry. This measurement is then digitized by the ADC, and sent to transceiver 82 during subsequent interrogation. In one embodiment, the measurement is stored within the memory of transponders 92-98 for retrieval during the subsequent interrogation.

In one application, limited-access area 90 is a scientific application where it is difficult to bring wires into a confined place. In another embodiment, limited-access area 90 is within a compass in a vehicle, such as an automobile, where it is not convenient or practical to route wires. In such applications, transponders are used to detect magnetic fields, including even the earth's magnetic field, and transponders 92-98 detect the measured field.

In one embodiment, radio frequency signals received from transceiver 82 are received by the associated transponder antenna within transponders 92-98, and sent to analog circuitry, which in one case includes a capacitive circuit and charge pump. Energy stored in the capacitive circuit is then used to control digital circuitry within each of transponders 92-98. The digital circuitry then activates the sensor, such as a Hall-effect sensor, to make a magnetic measurement. Such magnetic measurement is then converted to a digital signal by the ADC and stored in the memory.

Once the digital representation of the magnetic measurement is stored in the memory of transponders 92-98, transceiver 82 then interrogates each of transponders 92-98 and receives the digitized measured signal using a simple bit protocol along with identification bits for each of the transponders 92-98. Thus, the identification bits will identify the transponder 92-98 from which the measurement came, and software can translate the received data and associate each transponder 92-98 with each measurement location 102-108.

In one embodiment, in addition to the identification bits for the particular transponder and the digital representation of the magnetic measurement, a conversion factor is also built into each of the transponders and is read by the transceiver to determine how to convert the digital representation of the magnetic measurement into an actual magnetic measurement. In some cases, a conversion factor is encoded within the transponders 92-98 so that the measured signal received by transceiver 82 is an absolute representation of the actual measured value. In other cases, the measured signal received is a more relative signal such that encoding of that signal will take place in software associated with transceiver 82 to determine its actual value.

In one embodiment, RFID system 80 includes first-fourth transponders 92-98 which are active transponders. In this embodiment, first-fourth transponders 92-98 are configured such that each has a battery or similar energy storage device within the analog circuitry of each transponder. This provides an RFID system 80 with excellent range, meaning that transponders 92-98 are operable even when placed a considerable distance from transceiver 82. For example, in one embodiment first-fourth transponders 92-98 are active and include Hall-effect sensors. In this way, first-fourth transponders 92-98 sense and store magnetic measurements, even when they are remote from or out of range of transceiver 82. Transceiver 82 then interrogates first-fourth transponders 92-98 to retrieve the magnetic measurements when first-fourth transponders 92-98 are back in range.

In one embodiment, RFID system 80 includes first-fourth transponders 92-98 which are passive transponders. In one such embodiment, first-fourth transponders 92-98 are configured very similarly to transponder 40 illustrated in FIG. 3. In this way, a capacitive circuit and charge pump are provided within the analog circuitry of each transponder 92-98.

In one embodiment of these passive transponders 92-98, each can also further include a charge building device. In this way, radio frequency signals received from transceiver 82 by transponders 92-98 builds up additional charge over a period of time. This additional built-up charge can then be used to power the control circuitry within transponders 92-98. In this way, RF signals are sent by transceiver 82 to the various transponders 92-98 over a first period of time. Subsequently, that charge is released and used to power control circuitry over a second period of time, which is a shorter period of time than the first. In this way, a relatively large signal is generated within each transponder 92-98 due to the quicker dispensing of that stored energy relative to how it was received. In one case, the charge building device within passive transponders 92-98 is a capacitive ladder, or similar circuitry for building and storing energy over time.

RFID system 80 provides a connectionless system and method for making measurements in difficult to access areas. Unlike many current systems, there are no wires at each of the measurement locations 102-108. A single measurement location is provided, or several measurement locations and corresponding measuring transponders are provided, all using the same simple RFID interface.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A measurement system, comprising:
  a transceiver configured to send and receive radio frequency signals;
  a first transponder configured to receive radio frequency signals from the transceiver and to send radio frequency signals to the transceiver when within range of the transceiver, the first transponder comprising a Hall-effect sensor;
  wherein the transceiver is configured to send an activation signal to the first transponder when in range of the transceiver, thereby enabling the Hall-effect sensor to make a measurement; and wherein the first transponder is configured to make and to hold a measurement while outside the range of the transceiver.

2. The measurement system of claim 1, wherein the first transponder further includes a first transponder memory configured to store the measurement.

3. The measurement system of claim 2, wherein the transceiver is further configured to interrogate the first transponder when the first transceiver is in range of the transponder in order to receive the measurement stored in the first transponder memory.

4. The measurement system of claim 3, wherein the first transponder further comprises an analog-to-digital converter coupled to the Hall-effect sensor such that the measurement is converted to a digital value before it is stored in the first transponder memory.

5. The measurement system of claim 4, wherein digital value stored in the first transponder memory is stored with a simple bit protocol, with identification bits that identify the first transponder and encoded with a conversion factor for determining an actual measured value.

6. The measurement system of claim 3, wherein the first transponder is an active transponder farther comprising analog circuitry configured with a battery.

7. The measurement system of claim 3, wherein the first transponder is a passive transponder further comprising analog circuitry configured with a charge circuit and a capacitor such that radio frequency signals received from the transceiver while in range supply energy to the charge circuit and a capacitor, and wherein the energy within the charge circuit and capacitor is supplied to the Hall-effect sensor for making the measurement.

8. The measurement system of claim 7, wherein the analog circuitry of the first transponder farther comprises a capacitor ladder circuit such that radio frequency signals received from the transceiver build up energy over time.

9. The measurement system of claim 1, wherein the first transponder is placed adjacent a first measurement location emitting a magnetic field such that the Hall-effect sensor measures the magnetic field at the first measurement location.

10. The measurement system of claim 1, further comprising a second transponder, which further comprises:
a second transponder sensor; and
a second transponder memory;
wherein the transceiver is configured to activate the second transponder when in range of the transceiver thereby enabling the second transponder sensor to make a measurement and to store the measurement in the second transponder memory.

11. A method of making a measurement comprising:
sending radio frequency signals from a transceiver to a transponder while the transponder is within transmission range of the transceiver;
making a measurement with a Hall-effect sensor within the transponder while the transponder is outside the range of the transceiver; and
holding the measurement within the transponder.

12. The method of claim 11, further including interrogating the transponder with the transceiver via radio frequency signals such that the transceiver receives the measurement made by the sensor.

13. A method of making a measurement comprising:
sending radio frequency signals from a transceiver to a transponder while the transponder is within range of the transceiver;
charging an analog circuit within the transponder from the radio frequency signals received from the transceiver; and
activating a Hall-effect sensor within the transponder using the charged analog circuit;
making a measurement with the Hall-effect sensor while the transponder is outside the range of the transceiver; and
interrogating the transponder with the transceiver via radio frequency signals while in range such that the transceiver receives the measurement made by the Hall-effect sensor.

14. The method of claim 13, wherein the sensor within the transponder makes and analog measurement and the method farther comprising converting the analog measurement to a digital value.

15. The method of claim 14 further comprising storing the measurement within a memory of the transponder.

16. The method of claim 13, wherein charging the analog circuitry further comprises using the radio frequency signals received from the transceiver to charge a charge circuit and a capacitor.

17. The method of claim 16, wherein charging the analog circuitry further comprises using the radio frequency signals received from the transceiver to charge a charge circuit and a capacitor ladder circuit such that radio frequency signals received from the transceiver build up energy over time.

18. The method of claim 13, further comprising placing the transponder near a measurement location outside the range of the transceiver that is not readily accessible.

* * * * *

UNITED STATES PATENT AND TRADEMARK OFFICE
CERTIFICATE OF CORRECTION

PATENT NO. : 7,330,119 B2
APPLICATION NO. : 11/117803
DATED : February 12, 2008
INVENTOR(S) : Christopher G. Malone et al.

It is certified that error appears in the above-identified patent and that said Letters Patent is hereby corrected as shown below:

In column 2, line 13, delete "(RFD)" and insert -- (RFID) --, therefor.

In column 7, line 23, in Claim 6, delete "farther" and insert -- further --, therefor.

In column 7, line 34, in Claim 8, delete "farther" and insert -- further --, therefor.

In column 8, line 32, in Claim 14, delete "farther" and insert -- further --, therefor.

Signed and Sealed this

Tenth Day of June, 2008

JON W. DUDAS
*Director of the United States Patent and Trademark Office*